United States Patent [19]

Miller

[11] 4,003,273
[45] Jan. 18, 1977

[54] MULTI-RATIO TRANSMISSION SYSTEMS
[75] Inventor: Albert Arthur Miller, Esher, England
[73] Assignee: Wilson-Miller & Co. Ltd., Hampton Court, England
[22] Filed: Mar. 27, 1975
[21] Appl. No.: 562,500
[30] Foreign Application Priority Data
  Mar. 30, 1974  United Kingdom ............ 14223/74
[52] U.S. Cl. .................................. 74/767; 74/766
[51] Int. Cl.² ...................................... F16H 57/10
[58] Field of Search ........................... 74/767, 766
[56] References Cited
UNITED STATES PATENTS
3,298,252  1/1967  Harris et al. ................. 74/767 X Primary Examiner—Leonard H. Gerin
Attorney, Agent, or Firm—Woodhams, Blanchard and Flynn

[57] ABSTRACT

A multi-ratio power transmission for a vehicle having a torque-converter or fluid coupling, the output of which can be selectively coupled by clutches to a larger or a smaller sun wheel of a planetary gear set having long planet pinions meshing with the larger sun wheel and short planet pinions meshing with the smaller sun wheel and an output annulus. The small sun pinion is disposed on the input side of the planetary gearing, and a direct drive from the input of the transmission is selectively engagable to drive the planet carrier of the planetary gear set for use in establishing a direct wholly mechanical overdrive ratio bypassing the fluid coupling or torque-converter.

8 Claims, 6 Drawing Figures

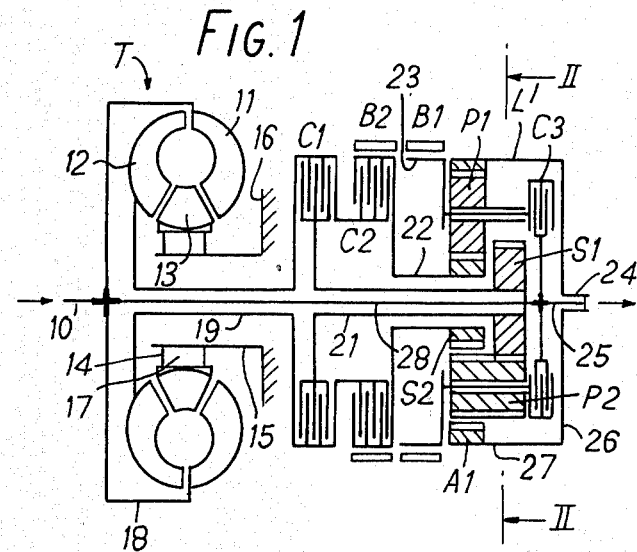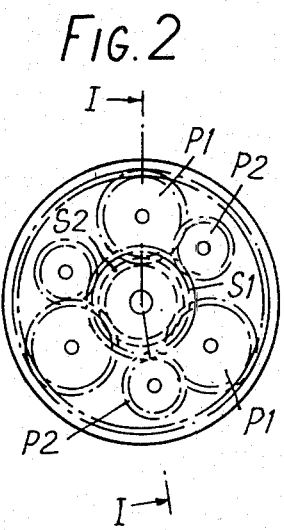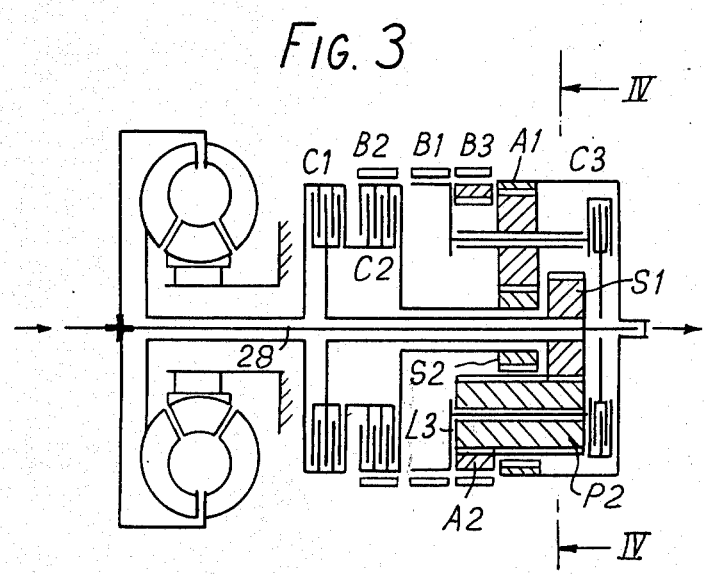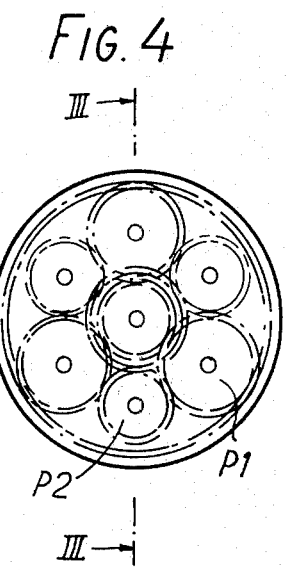

MULTI-RATIO TRANSMISSION SYSTEMS

FIELD OF THE INVENTION

This invention relates to variable-speed transmission systems and more particularly to those intended for use in automobiles powered by internal-combustion engines.

BACKGROUND OF THE INVENTION

The widely employed system, utilizing a hydrokinetic torque-converter or fluid coupling in conjunction with planetary gearing is known to suffer from the disadvantage of reduced efficiency through slip losses in the torque-converter or fluid coupling, and the present invention has for one of its objects a means of eliminating or reducing this loss when using the higher speed ratios of the transmission.

It is also well known that the characteristics of the internal-combustion engine are such that its specific fuel consumption varies with engine speed, and that fuel economy can therefore be gained by providing such gear ratios between engine and driving wheels that enables the engine to run mainly at the most efficient engine speed that will permit it to provide sufficient power to drive the vehicle at the speed required. For these reasons the present invention has for another of its objects to provide in the transmission unit not only a direct-drive but also a suitable overdrive ratio (one in which the output shaft is driven at a rotational speed greater than that of the input shaft) so that the highest economy can be obtained in the overdrive ratio, while greater acceleration, and in some circumstances greater vehicle speed, is obtainable in the direct-drive ratio. It is a further object of the invention that when either of these two ratios is in use the loss of efficiency inherent in the torque-converter or fluid coupling shall be eliminated or reduced and that the efficiency of the transmission gearing shall be high in these two ratios.

A suitable relationship between the numberical values of the overdrive ratio and the direct drive ratio lies between the limits of 1.25 and 1.4.

According to the invention there is provided a variable speed power transmission comprising a hydrokinetic torque transmitter whose input member is adapted to be driven by a prime-mover and a planetary gear-set disposed coaxially in relation to the torque transmitter and on that side of the latter which is nearer the final output member of the transmission, the said gear-set having a larger sun pinion and a smaller sun pinion, a planet carrier mounted on bearings coaxially with the said sun pinions and with the torque transmitter and provided with selectively operable braking means, a ring-gear secured to an output member of the transmission for rotation therewith coaxially with the planet carrier and having internal teeth disposed in the same transverse plane as that of the smaller sun pinion, a set of short planet pinions and a set of long planet pinions mounted on bearings in the planet carrier, the short planet pinions each meshing with the smaller sun pinion and with the ring-gear, the long planet pinions each meshing with the larger sun pinion and with one or more of the short planet pinions but not engaging either the ring-gear or the smaller sun pinion, characterised in that the smaller sun pinion is disposed on that side of the larger sun pinion which is nearer to the torque transmitter and is provided with selectively operable braking means whereby it may be arrested to provide the reaction for the overdrive ratio and each sun pinion is provided with independent clutching means whereby either or both sun pinions may be drivably connected to the turbine or output member of the torque-converter, and in that the transmission includes further independent clutching means whereby a driving connection may be established between the input member of the torque transmitter and the planet carrier through the medium of a central drive shaft which passes freely through the torque transmitter and through the two sun pinions.

Transmission systems employing torque-converters and planetary gearing have been proposed in which the planetary gearing is disposed coaxially with the torque-converter and has two clutchable input drives, one of which is taken from the converter input member and the other is taken from the converter output member, thus enabling part of the transmitted power to by-pass the converter in the direct-drive ratio. The present invention employs the system so described, but its novelty lies in the arrangement and disposition of the various gear elements so as to provide a suitable overdrive ratio in addition to a direct drive and a reverse drive and reduction ratios, the arrangement providing, in the overdrive ratio, a power path utilizing a minimum number of gear meshes in series in order to achieve high gear efficiency in keeping with the best planetary gear design practice, the arrangement at the same time enabling the direct drive to be taken either wholly or partially through the torque-converter or fluid coupling forming the torque transmitter or to be taken wholly and directly from the engine to eliminate all slip losses in the torque transmitter. The arrangement according to the present invention also provides for at least two reduction ratios (in which the output shaft rotates slower than the input shaft) and a reverse-drive ratio approximately equal to or lower than the lowest reduction ratio, all of which ratios are powered wholly through the torque-converter or fluid coupling.

The planetary gear-set hereinbefore defined can be shown to provide a reverse drive ratio and four forward drive ratios including two reduction ratios, a direct drive and an overdrive ratio. Optionally the said gear-set may be extended in order to provide a supplementary reduction ratio intermediate between the said two reduction ratios, thereby yielding five forward drive ratios including direct drive and overdrive.

The said supplementary reduction ratio is advantageously made available by the introduction of a supplementary ring-gear of smaller pitch-circle than the first mentioned ring-gear and disposed on that side of it which is remote from the output member of the transmission, the supplementary ring-gear being in mesh with the said long planet pinions which, with the planet carrier, may be extended in axial length beyond the plane of the short planet pinions sufficiently to make this possible. The supplementary ring-gear is also provided with independently selectable braking means to hold it against rotation when the supplementary reduction ratio is required.

BRIEF DESCRIPTION OF THE DRAWINGS

Embodimennts of the invention will now be described by way of example with reference to the accompanying drawings, in which:

FIG. 1 is a composite longitudinal axial section on the line I—I of FIG. 2 through a variable ratio power transmission according to the invention, FIG. 2 is a cross section on the line II—II of FIG. 1, FIG. 3 is a longitudinal sectional view on the line III—III of FIG. 4 of a power transmission similar to that shown in FIGS. 1 and 2 but modified to give an extra indirect gear ratio, FIG. 4 is a cross section on the line IV—IV of FIG. 3.

DETAILED DESCRIPTION

Figure 5:
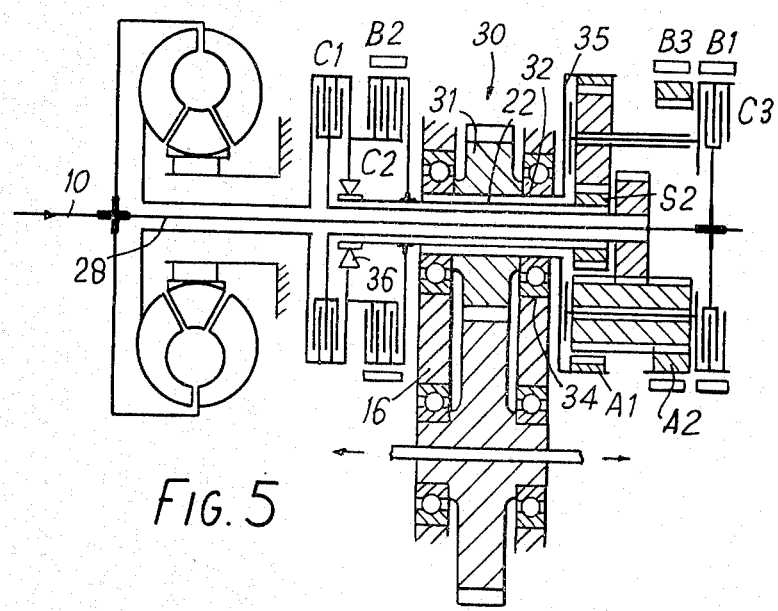
FIG. 5 is a view similar to FIG. 3 of a transmission similar to that shown in FIG. 3 but modified so as to have an output taken from a point between the torque transmitter and the planetary gearing.

The transmission shown in FIGS. 1 and 2 comprises a torque-converter T of the conventional three-element type having co-axially mounted rotatable pump, driven and reaction members 11, 12 and 13 respectively. The pump member 11 is connected to the input element 10 of the transmission. The reaction member 13 is carried on bearings 14 on a fixed sleeve 15 which projects through an oil-tight gland (not shown) in the pump member 11 and is secured at its outer end to the stationary housing 16 of the transmission. The reaction member 13 is prevented from rotation in the direction opposite to that of normal rotation of the input member 10 by means of a uni-directional sprag clutch 17. The pump member 11 is secured to an outer rotary casing 18 connected to the input member 10 which may be the shaft of an internal combustion engine or other prime-mover. The casing 18 encloses the driven or turbine member 12 which is secured to a tubular shaft 19 which passes freely through the center of the fixed sleeve 15 to enter the transmission housing 16 where it is flanged outwards and is permanently secured to the driving elements of first and second friction clutches C1 and C2 which are independently operable to their engaged state by the selective application of oil pressure.

The output or driven member of the first clutch C1 is secured to a tubular shaft 21 which in turn carries a large sun wheel S1 or pinion at its other end. The tubular shaft 21 passes freely through the center of a smaller sun wheel or pinion S2. The output or driven member of the second clutch C2 is secured to a sleeve 22 which carries the smaller sun wheel S2, the tubular shaft 21 extending freely through the sleeve 22. The outer surface of the driven member of the second clutch C2 forms a brake drum which can be held stationary by a band brake B2 which is selectively operable by oil pressure for the purpose of holding the smaller sun wheel S2 against rotation when required. As indicated in FIG. 1, the clutches C1 and C2 are multi-plate friction clutches of well known construction.

A planet carrier $L^1$ is mounted for rotation about the common axis of the torque-converter and shaft 21 and carries a brake drum 23 at one end for co-operation with a band brake B1 which is selectively operable by oil pressure when it is required to hold the planet carrier $L^1$ against rotation. This end of the planet carrier $L^1$ may be supported in a bearing in an inwardly projecting flange (not shown) of the transmission housing 16 which passes between it and the driven member of the clutch C2. In this region, there may also be installed a uni-directional sprag clutch arranged between the planet carrier $L^1$ and the stationary flange so as to prevent the planet carrier from rotating in the opposite direction to the direction of rotation of the input member 10, such an arrangement being known to facilitate smooth transition from first ratio to second ratio.

A set of short planet pinions P1 is rotatably mounted in the planet carrier $L^1$ and mesh with the smaller sun wheel S2 and with a set of long planet pinions P2 at one end thereof, which are also rotatably mounted in the planet carrier $L^1$ and mesh at their other ends with the larger sun wheel S1. An internally toothed ring-gear A1 meshes with the short planet pinions P1 but does not mesh with the long planet pinions P2. The ring gear A1 is secured to an output member 24 of the transmission.

A third friction clutch C3 which is also independently operable by oil pressure is mounted at the end of the planet carrier opposite to the brake drum 23 and has its driven member secured to the planet carrier $L^1$, the latter being extended outwardly of the clutch C3 to terminate in a short arbor which is journalled within the output member 24 for the purpose of supporting the adjacent end of the planet carrier, the output member 24 itself being supported in a bearing or bearings in the transmission housing and being connected to the ring gear A1 by a flange 26 and a sleeve extension 27.

The driving or input member of the third clutch C3 is secured to a central shaft 28 which extends from a supporting extension 25 freely through the tubular shaft 21 and sleeve 19 to the input member 10.

OPERATION

In operation, when the clutches and all the brakes are disengaged, the transmission is in the neutral state and no driving connecting is established between the input and output members 10 and 24.

Reverse drive is established by engaging the second clutch C2 to connect the output member 12 of the torque-converter through the tubular shaft 19 to drive the smaller sun pinion S2 while also applying the brake B1 to hold the planet carrier. The drive path is then from the smaller sun pinion S2 through the short planet pinions P1, acting as idler pinions, to the ring gear A1 which drives the output member 24 in the opposite direction of rotation to that of the member 12, and at a speed which is reduced in the ratio of the number teeth in the small sun S2 to the number in the ring gear A1.

To obtain first speed ratio, the first clutch C1 is engaged with the second clutch C2 disengaged. If the sprag clutch is used to prevent backward rotation of the planet carrier $L^1$, a forward drive will be obtained without application of the brake B1. Otherwise, the brake B1 must be applied; similarly, it must be applied if negative torque has to be transmitted in first-speed ratio, as for example for the purpose of retarding the motion of the vehicle. It will be noted that all the power transmitted in the first-speed ratio must pass through the torque-converter and the first clutch C1 to the larger sun, the power path being then through the long planet pinions P2 to the short planet pinions P1 and thence to the ring gear A1 which drives the output member 24 in the same direction as the input since the long and short planet pinions together act as a double idler pinion train, the speed being reduced in the planetary gearing in the ratio of the number of teeth in the larger sun pinion S1 to the number in the ring-gear A1.

The next higher ratio is obtained by releasing the brake B1 and applying the brake B2 to hold the smaller sun pinion S2 stationary, the first clutch C1 remaining engaged. The power path through the gearing is then from the large sun pinion S1 through the long planet pinions P2 to the short planet pinions P1 which, by reacting on the stationary smaller sun pinion S2, drive the planet carrier L$^1$ forwardly, i.e. in the direction of input rotation, the short planet pinions P1 at the same time transmitting a drive between the long planet pinions P2 and the output ring-gear A1 which in consequence is driven forward at a higher speed of rotation than that of the planet carrier L$^1$.

By releasing both brakes B1 and B2 and engaging the second clutch C2 together with the first clutch C1, the planetary gear set is locked for en bloc rotation and a direct drive is obtained between the output member 12 of the torque-converter and the output member 24 of the transmission, all the power being taken through the converter.

If the third clutch C3 is also engaged, the torque-converter T is bypassed and all the power then passes through the central shaft 28 to the locked-up gear set, thus eliminating all slip losses.

A further mode of direct drive is obtainable by engaging only the first and third clutches C1 and C3. The driving torque from the prime-mover is then divided between two paths. The greater portion of the torque passes directly through the central shaft 28 and the remainder passes through the torque-converter T to the tubular shaft 19. The output torque from the torque-converter is reunited with the torque from the central shaft 28 by means of the planetary gear set to produce a torque value at the output member 24 which is substantially equal to the input torque under a condition such that the converter is acting as a fluid coupling without torque multiplication. The output torque is slightly greater than the input torque when the torque-converter speed is reduced below its coupling range. The reduced level of torque applied to the torque-converter in this mode of direct drive results in reduced slip losses while retaining a small amount of torsional resilience which is beneficial at low speeds.

The highest ratio which is an overdrive ratio is obtained by engaging only the third clutch C3 and the brake B2 which holds the small sun pinion S2. Under these conditions, the power is transmitted entirely through the central shaft 28 to the planet carrier L$^1$ and all slip losses are eliminated. Moreover, the gear losses in this overdrive ratio are minimal since the power path through the gear set is from the planet carrier L$^1$ to the output ring-gear A1 using only the short planet P1 to provide the driving connection while taking the reaction from the smaller sun pinion S2. Thus there is no power transfer between the pinions P1 and P2 which could cause transmission losses and thus reduced efficiency when the vehicle is crusing in overdrive ratio.

Typical tooth numbers for the planetary gear set shown in FIGS. 1 and 2 are as follows:

Large sun pinion S1 33 teeth, small sun pinion S2 27 teeth, the ring-gear A1 78 teeth, the short planet pinions P1 25 teeth and the long planet pinions P2 19 teeth. Such an arrangement would yield the following ratios:

Reverse 2.9;1, first-speed 2.36;1, second speed 1.35;1, third speed direct drive, fourth, overdrive speed 0.744;1.

MODIFICATIONS

The embodiment shown in FIGS. 3 and 4 is in many respects similar to that shown in FIGS. 1 and 2 but provides an additional reduction ratio and corresponding parts are accordingly indicated by the same reference numerals and letters. Here the numbers of teeth in the three long planet pinions P2 and in the three short planet pinions P1 are equal to those in the smaller sun pinion S2 and in the larger sun pinion S1 respectively so that each of the long pinions P2 can mesh with both of its two neighbouring short pinions P1.

Furthermore, the length of the long planet pinions P2 has been increased to provide an extra portion which meshes with a second ring-gear A2 the outer surface of which forms a brake drum for co-operation with a third band brake B3.

The power transmission shown in FIG. 5 is a modification of that shown in FIGS. 3 and 4 for use where it is required to deliver power to an output member whose axis displaced from that of the input member 10. Thus, a first gear wheel 31 of an output gear train 30 is secured to a tubular shaft 32 which surrounds the shaft 22 carrying the smaller sun pinion S2. The tubular shaft 32 is mounted in bearings 34 in the housing 16 and has a flange 35 carrying the output ring-gear A1. The layout of the planetary gear set is essentially the same as that shown in FIGS. 3 and 4 with the exception that the supplementary gear-ring A2 and its band brake B3 are now at the end of the gear set opposite to the torque-converter. The operation of the transmission shown in FIG. 5 is otherwise the same as that of the transmission shown in FIGS. 3 and 4. A uni-directional sprag device 36 between the smaller sun wheel S2 and the driven element 12 of the torque-converter prevents the former from overrunning the latter.

Figure 6:
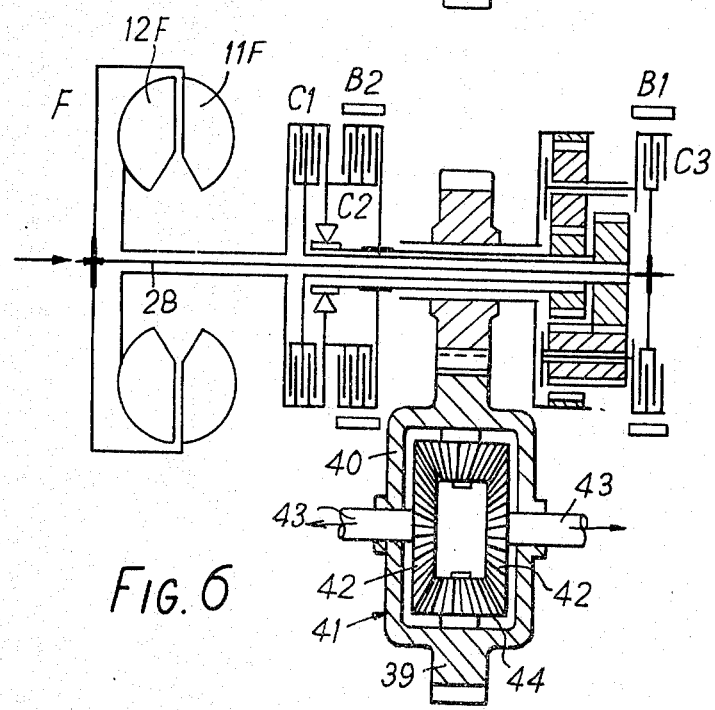
FIG. 6 is a view similar to FIG. 1 of a further modified transmission having a fluid coupling in place of a torque-converter and output members whose axis is displaced from that of the fluid coupling.

FIG. 6 shows a similar modification carried out to the transmission shown in FIGS. 1 and 2. In addition, the torque-converter has been replaced by a two-element fluid coupling F of the kind which has no reaction member and cannot, therefore, carry out any torque multiplication. In accordance with conventional practice it is of the traction type having an impeller or pump element 11F and a runner or driven element 12F, the elements 11F and 12F defining a toroidal working circuit.

The transmission shown in FIG. 6 is in a form suitable for mounting above an axle of a vehicle, whether steered or not. For this purpose, the final gear 39 of the output drive train 31 is in the form of an externally toothed gear-ring secured to the cage 40 of a differential gear 41 of the conventional bevel-gear type in which two output bevel-gear wheels 42 are secured to half shafts 43 for driving respective road wheels (not shown) and bevel pinions 44 mesh with the bevel-gears 42 and are mounted in the cage 40 for rotation about axes which are radial to the common axis of the half shafts 43.

As in the case of FIG. 5, the transmission shown in FIG. 6 includes a uni-directional sprag device between the driving and driven members of the second clutch C2 ensuring that when the clutch C2 is disengaged, its driven or output member and thereby the smaller sun pinion S2 are prevented from overrunning the driving or input member of the clutch C2, which is secured to the output member 12 of the torque-converter (in the case of FIG. 5) or the fluid coupling (in the case of FIG. 6) in the direction of normal rotation of the input member 10. This arrangement promotes smooth transition in gear shifting from direct drive to overdrive ratio and vice versa by maintain a form of direct drive during the interval between disengaging the first or second clutch C1 or C2 and engaging the brake B2 to hold the smaller sun pinion S2 and vice versa. Further, this arrangement prevents a vehicle from rolling backwards after having been brought to rest on a steep up-hill gradient, so long as first-speed ratio is engaged.

An alternative location for the third clutch C3 in any of the embodiments described above would be within the rotary casing of the torque-converter of fluid coupling, the driving or input member of the clutch C3 being then secured to the internal surface of the said rotary casing while its driven or output member is secured to the adjacent end of the central shaft 28 whose opposite end would then be secured to the remote end of the planet carrier L.

The detailed arrangements for supplying operating fluid under pressure to the various clutches and brakes will follow conventional practices in the art and are not therefore considered to require detailed explanation here. Similarly, those skilled in the art will appreciate that many apparently widely varying changes could be made to the embodiments described above without departing from the spirit of the invention. As an example, any one or more of the band brakes could be replaced by a friction disc arrangement.

I claim:

1. A variable speed-ratio power transmission comprising a hydrokinetic torque transmitter whose input member is adapted to be driven by a primer-mover and a planetary gear set disposed coaxially in relation to the torque transmitter and on that side of the latter which is nearer the final output member of the transmission, the said gear set having larger sun pinion and a smaller sun pinion, a planet carrier mounted on bearings coaxially with the said sun pinions and with the torque transmitter and provided with selectively operable braking means, a ring-gear secured to an output member of the transmission for rotation therewith coaxially with the planet carrier and having internal teeth disposed in the same transverse plane as that of the smaller sun pinion, a set of short planet pinions and a set of long planet pinions mounted on bearings in the planet carrier, the short planet pinions each meshing with the smaller sun pinion and with the ring-gear, the long planet pinions each meshing with the larger sun pinion and with one or more of the short planet pinions but not engaging either the ring-gear or the smaller sun pinion, characterised in that the smaller sun pinion is disposed on that side of the larger sun pinion which is nearer to the torque transmitter and is provided with selectively operable braking means whereby it may be arrested to provide the reaction for an overdrive ratio and each sun pinion is provided with independent clutching means whereby either or both sun pinions may be drivably connected to the turbine or output member of the torque-transmitter, and in that the transmission includes further independent clutching means whereby a driving connection may be established between the input member of the torque transmitter and the planet carrier through the medium of a central drive shaft which passes freely through the torque transmitter and through the two sun pinions.

2. A power transmission according to claim 1, wherein each of the short planet pinions meshes with two of the long planet pinions, on opposite sides of the short planet pinion, and each of the long planet pinions meshes with two of the short planet pinions, on opposite sides of the long planet pinions.

3. A power transmission according to claim 2, wherein there are three short planet pinions and three long planet pinions all disposed on a common pitch circle and each long planet pinion has the same number of teeth as the smaller sun pinion and each short planet pinion has the same number of teeth as the larger sun pinion.

4. A power transmission according to claim 1, wherein the long planet pinions are further extended to mesh with a supplementary ring-gear, and the transmission includes braking means for selectively holding the supplementary ring-gear stationary.

5. A power transmission according to claim 1, wherein the output of the transmission is coaxial with the input to the transmission and the ring-gear is secured to the output member of the transmission through a sleeve surrounding the planet carrier and planet pinions.

6. A power transmission according to claim 1, having an output gear train situated between the smaller sun pinion and the torque transmitter, the output gear train having a first gear coaxial with the input to the transmission and connected to the ring-gear by a flange.

7. A power transmission according to claim 1 and including a uni-directional clutch connected between the smaller sun pinion and the turbine or output member of the torque transmitter for preventing the smaller sun pinion from overrunning the turbine or output member of the torque transmitter.

8. A power transmission according to claim 4, wherein there are three short planet pinions and three long planet pinions all disposed on a common pitch circle and each long planet pinion has the same number of teeth as the smaller sun pinion and each short planet pinion has the same number of teeth as the larger sun pinion.

* * * * *